Patented July 5, 1927.

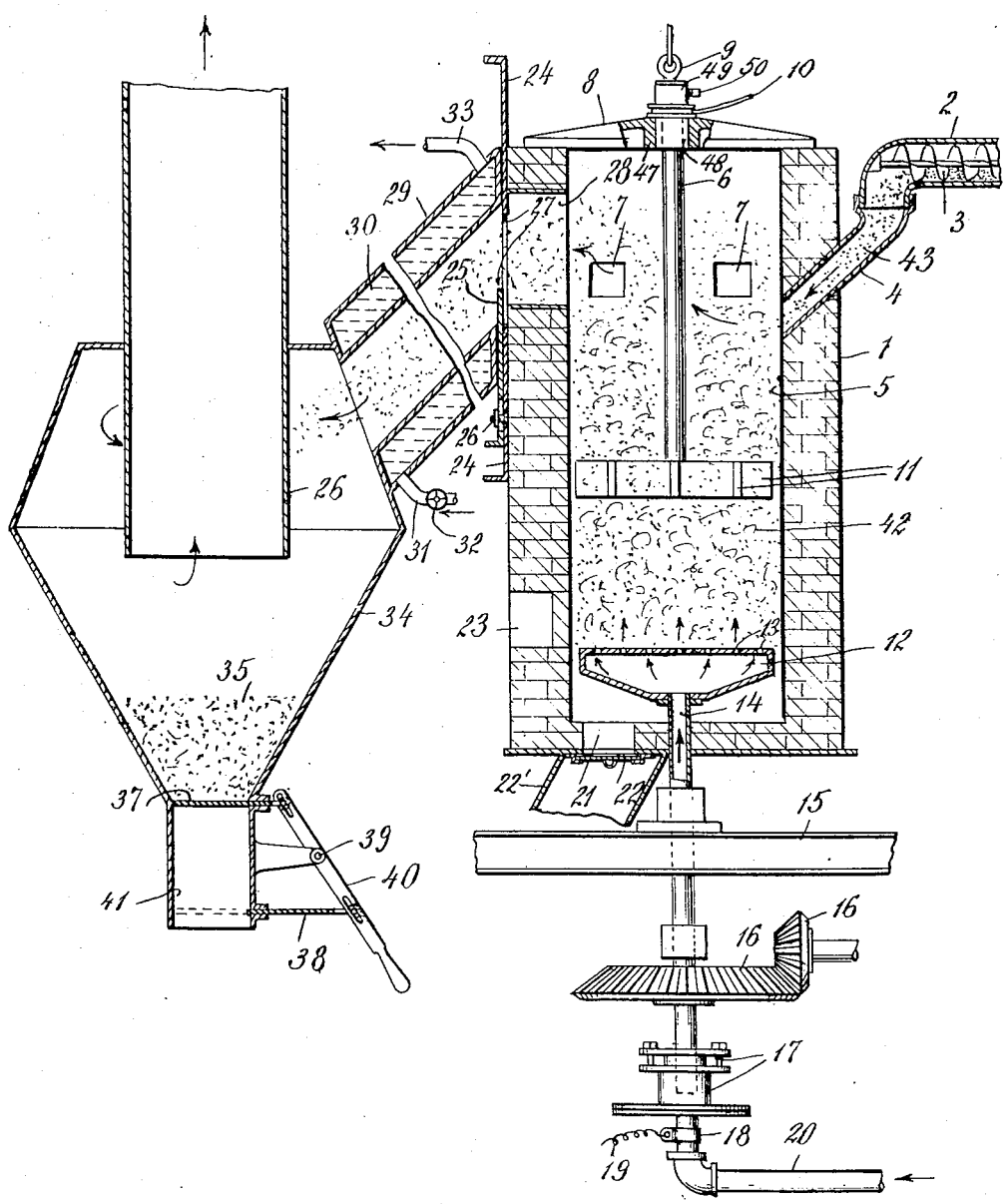

1,634,478

UNITED STATES PATENT OFFICE.

LEONARD WICKENDEN, OF FLUSHING, NEW YORK, AND STANLEY A. W. OKELL, OF TYRONE, PENNSYLVANIA, ASSIGNORS TO INDUSTRIAL CHEMICAL COMPANY, OF NEW YORK, N. Y., A CORPORATION OF NEW YORK.

PROCESS AND APPARATUS FOR MAKING DECOLORIZING CARBON.

Application filed February 18, 1922. Serial No. 537,571.

This invention relates especially to the manufacture of decolorizing carbon which may be used effectively for clarifying or decolorizing sugary and other materials. The process may comprise the treatment of calcined or carbonized dissolved vegetable material or other suitable carbonaceous material as in a vertical electric furnace where a mass or column of the granular carbonaceous material may be highly heated and simultaneously treated with strong jets or currents of steam, carbon dioxide, air or mixtures thereof, or of other desired treating gases. The hot granular carbonaceous material may thus be activated to a considerable extent and also stirred and carried up sufficiently by the treating gases so as to be kept in a state of ebullition or suspension in the furnace and thoroughly agitated; and this seems to cause sufficient abrasive contact or other action to separate or disintegrate the more friable outer portions of the carbon particles which are the most valuable and active decolorizing material, and which are considerably lighter than the relatively unchanged central portions of the particles. These finer disintegrated portions or particles are, of course, carried up more readily by the ascending currents or jets of treating gas and may be thereby carried out of the furnace chamber to a suitable centrifugal or other separator so that the smaller more activated particles of the carbonaceous material may thus be continually separated and recovered while fresh untreated carbon, preferably of this porous granular character, may be fed to the furnace. If desired, however, the granular carbon may be heated and agitated in any suitable way, and gaseous currents may be produced by any suitable means so as to carry up or separate these finer or lighter activated particles which can be thereby or otherwise removed from the furnace. Where the lower electrode for heating the furnace is formed with the injecting openings or blast nozzles through which the treating gases are injected, it is usually desirable to have at least the lower electrode move or rotate in the furnace, since in this way the carbonaceous material is more uniformly heated and treated and localized packing of the material correspondingly prevented.

In the illustrative apparatus shown in the accompanying drawing which is a diagrammatic vertical section, the electric furnace 1 may be formed of brick work or other suitable material so as to provide a furnace chamber which is preferably substantially vertical and may have an inside dimension or diameter of two to four feet more or less at least throughout the lower portion 5 adjacent the heating electrodes. A feed tube such as 4 of earthenware etc. may be carried through the side of the furnace so as to feed into the furnace chamber the desired carbonaceous material 43 such, for instance, as substantially uniformly sized, finely granular calcined carbon of substantially uniformly porous character which may be formed by calcining at high temperature, preferably in the presence of carbon dioxide, the carbonized dissolved vegetable matter contained for instance in the waste soda liquors formed when paper pulp is made by the caustic soda process, or the waste sulphite liquors from the sulphite wood pulp process may in some cases be used as the source of this granular carbonized material. This carbonaceous material may be preferably fed in hot condition by the screw conveyor 3 through the casing 2 communicating with the feed tube so as to be fed into the furnace without substantial or undesirable leakage of air into the same. The upper electrode 11 may comprise a series of narrow radially projecting arms so as to give ample contact with the carbon and yet not interfere unduly, especially at the outside of the furnace chamber, with the upward gas currents, and may be made of relatively infusible resistant metal connected by the stem 6 with a removable cover 8, for example, so that the whole may be lifted out of the furnace by the ring 9 and attached cable shown, which may be connected to a suitable counterpoise. The collar 49 adjustably secured to the rod 6 as by set screw 50 makes it possible to adjust the regular working height of this upper electrode. The heating current may be supplied to this electrode by the lead 10 for example; and this upper electrode may be insulated from the cover 8 by interposing a suitable insulating bushing 48 of mica or asbestos composition or of clay or porcelain between the stem 6 and the hub 47 of the cover. The cooperating lower electrode may be arranged in any desired way adjacent the lower portion of the furnace chamber and may, if desired, be formed with nozzle openings so as to inject into the furnace chamber the steam or other treating or separating gases which may also be used to activate the highly heated carbon. For this purpose the hollow electrode 12 may be formed with a series of nozzle openings 13 in its upper surface or portion and may be connected with the hollow stem 14 which is advantageously rotated so as to rotate this blast electrode within the furnace and promote the uniform agitation of the charge. For this purpose the stem 14 may be mounted in suitable bearings on supports such as 15, for instance, including the stuffing box 17, and may be rotated by the connected gearing 16 at the desired rate of four to ten revolutions per minute, more or less. The injecting pipe 20 may be connected to the stuffing box 17 and the electric current may be supplied to this electrode as through the grounded lead 19 and connected collar 18.

The furnace may be provided at various points around its lower circumference with suitable cleanout openings or doors such as 21 and 23 and the slide 22 and chute 22' may be arranged at each lower opening 21. Also the furnace may have suitable peep holes through which small amounts of air may sometimes be admitted such as 7 in various parts, particularly in the upper part of the furnace adjacent the discharge opening 28 which is preferably on the opposite side from the feed tube 4 and may communicate with a depending conduit or passage 29 leading into a suitable separator such as the cyclone or centrifugal separator 34. This separator may comprise the central discharge flue 26 through which the gases may be discharged or delivered into any desired apparatus such as a suitable compressing or pumping device in some cases so that more or less of these gases may be supplied preferably in hot condition to the injecting pipe 20 for use in the furnace, if desired. The lower part of the separating chamber may be provided with an air lock discharge device having the alternately opening discharge doors 37, 38 moved in opposite directions as by the lever or handle 40 pivoted about the point 39 so as to alternately open and shut these doors at the top and bottom of the discharge chamber 41. It is quite desirable to considerably cool the treated carbon from the furnace and for this purpose the passage 29 may in some cases be five to twenty feet in length more or less, and provided with cooling means such as air currents or the cooling jacket 30 surrounding the passage and supplied with cooling air or steam or with cooling liquid through the inlet pipe 31 having the valve 32 while the somewhat heated water or other liquid may be discharged through the pipe 33. In some cases also it is desirable to adjust the height and extent of the effective discharge opening from the inner wall of the furnace through which the treated carbon particles pass; and for this purpose a regulating valve or damper 24 may be used sliding in a box or compartment between the furnace and discharge passage 29 while a cooperating cut-off valve 25 may be secured in position on this regulating valve as by the bolts 26 arranged in suitable slots in the regulating or cut-off valves. In this way the effective discharge opening 27 from the furnace may be adjusted in vertical width and also may be differently positioned so that the treated carbon particles may be withdrawn at a higher or lower point in the furnace chamber and the proportion and character of the discharged particles thereby regulated. Under normal operating conditions the top of the furnace charge is preferably maintained a few inches or so above the top electrode, by regulation of the feed of carbon to the furnace. The carbon particles which are carried or shot up from this agitated mass are naturally carried upward at different velocities, the lighter particles moving fastest as they leave the main mass and also being more influenced by the rising gas currents in the upper part of the furnace. The lighter more activated particles whenever they are shot up from the charge reach considerably higher levels in the furnace and the vertical adjustment of the effective discharge opening can thus make considerable differences in the recovered carbon.

In starting the furnace the granular carbon may be brought up to the desired high heat by the electric current between the electrodes and this preliminary heating may be effected, if desired, before treating gases are turned on or fully injected into the furnace. Where no gases are used at first the carbon particles of course rest in much closer contact with each other and the heating current under these conditions often becomes three to six times as great as the regular working current passing between the electrodes when the steam and other injecting gases are injected normally through the rotary hollow blast electrode at pressures of one to four pounds per square inch more or less. For this reason it is sometimes desirable to raise the upper electrode several inches or more when the carbon is first substantially heated; then the electrode can be lowered when the gas injection is gradually started. For a two foot diameter furnace the regular working current may be 50 to 100 amperes or so at about 220 volts, and this electric heating should be sufficient in connection with the other heat generated to raise the carbon at least in the active zone of the furnace to temperatures of 900 to 1000° C. more or less. In some cases steam alone may be used as the treating and separating gas and may be injected under sufficient pressure to carry up the carbon particles in a boiling agitated mass, the lighter particles at least being projected considerably above the upper electrode 11 and the steam pressure causing such violent agitation in the furnace as to separate, perhaps in connection with the chemical action taking place in this mass of porous carbon, the outer lighter more friable portions of relatively activated carbon which have a higher decolorizing value and lighter specific gravity. These smaller and more valuable carbon particles are thus so much lighter as to be carried up by the jets or currents of treating gases and finally carried out of the furnace chamber through the discharge opening 27 so that they pass into the separator after being preliminarily cooled, preferably to such a point that undesirable combustion can no longer take place at least when they are removed from the separator. Where steam is used in the injected treating gases a desirable chemical converting action takes place in the carbon since the hydrochloric acid which is usually driven off from the small percentage of chlorides present in the acid washed carbon particles 42 in the furnace can usually recombine with the small proportion of cooled alkali in the treated carbon 35 in the separator so that the proportion of free alkali is greatly reduced in the final decolorizing carbon which is of considerable importance, especially in the treatment of sugar solutions.

This automatic gravity or air floatation separation of the carbon by the treating gases in the electric furnace is so highly effective because of the decided difference in size of the carbon particles caused by this violent agitation and treatment of the carbon. This is shown by the following figures on percentages of treated and untreated carbon retained on the standard testing sieves:

|  | Untreated. | Treated. |
| --- | --- | --- |
|  | Per cent. | Per cent. |
| Retained on 20 mesh | 53.26 | 23.71 |
| Retained on 40 mesh | 83.64 | 74.31 |
| Retained on 80 mesh | 89.76 | 87.20 |
| Retained on 100 mesh | 93.40 | 88.03 |

This air separated activated decolorizing carbon also has considerably less specific gravity than the carbon fed to the treating furnace, tests showing 1.7 to 1.8 specific gravity of the air separated treated carbon as compared to 2.2 to 2.4 specific gravity for the porous calcined dissolved vegetable carbon fed to the furnace. The operation of the furnace also seems to effect a separation of the ash constituents of the carbon, which, to a very considerable extent fuse together so as to form at the bottom of the furnace porous clinker masses which, at the high temperature maintained, pick up and incorporate any smaller ash particles which touch them during the agitation of the furnace charge. An analysis of a sample of such fused ash clinker from this furnace is as follows:

|  | Per cent. |
| --- | --- |
| Loss on ignition (carbon) | 1.60 |
| $SiO_2$ | 45.05 |
| $Fe_2O_3 + Al_2O_3$ | 40.80 |
| $CaO$ | 9.10 |
| $MgO$ | 1.41 |
| Alkalies and sulphides (by difference) | 2.04 |
|  | 100.00 |

It is desirable to remove at least part of these clinker masses from the bottom of the furnace at least every 24 or 48 hours of operation, so that the furnace chamber will not be too greatly reduced in effective capacity. For these reasons, apparently, the ash content of this activated carbon can be reduced to less than half, in many cases, of the ash content of the original leacher refuse or refined, partly activated porous leacher refuse or other carbon which is fed to the furnace. For some purposes it seems desirable, in order to increase the furnace output and also increase the percentage yield therefrom as compared to the amount of carbon supplied to the furnace, to substantially uniformly size the porous carbon which is fed to the furnace. Good results have been secured when the original or refined leacher refuse, preferably after acid washing, is run through coarse crushing or sizing rolls so that the material is made much finer and more uniformly sized to something between about 10 and 60 linear mesh particles. These relatively finer particles are, of course, more quickly treated and activated in the furnace, and their more uniform size seems to result in even better decolorizing properties in the activated material separated and removed from the furnace by this air separation or air floatation method.

This activated carbon has very high decolorizing values for sugar and similar material, and the following results were secured by testing such air separated decolorizing carbon in comparison with similar amounts of Norit. When using 1% of carbon as compared to the weight of a 2% black strap molasses solution the Norit removed 71.2% of the color and this air separated carbon removed 97.2% of the color. When using 2% of the carbon on a 25% solution of Cuban raw sugar the Norit removed 92.3% of the color and such air separated carbon removed 97.4% of the color. The decolorizing value of the carbon is also very greatly increased as measured by the standard kerosene red test; the porous granular partly activated carbon supplied to the furnace usually has a decolorizing value of about 300 units on this basis, while the air separated treated carbon often has a decolorizing value of between 700 and 800 units on this kerosene red basis.

This invention has been described in connection with a number of illustrative forms, sizes, elements, parts, apparatus, materials, conditions, pressures, temperatures and times of treatment, to the details of which disclosure the invention is not of course to be limited; since what is claimed as new and what is desired to be covered by Letters Patent is set forth in the appended claims.

1. The process of making decolorizing carbon which comprises continuously feeding granular calcined dissolved vegetable carbon material into a tubular vertical electric furnace, heating the granular carbon by the electric current passing between an upper electrode and a lower rotary blast electrode slowly rotating adjacent the bottom of the furnace and simultaneously injecting hot treating gases comprising steam and carbon dioxide through said blast electrode into the mass of heated carbon to violently agitate the same and carry upward to relatively greater distances the smaller particles of softer and more friable activated carbon, carrying such smaller particles of activated carbon out of the furnace while suspended in the current of treating gases, cooling the same and centrifugally separating such carbon particles from the gases.

2. The process of making decolorizing carbon which comprises continuously feeding granular calcined dissolved vegetable carbon material into a tubular vertical electric furnace, heating the granular carbon by the electric current passing between an upper electrode and a lower blast electrode adjacent the bottom of the furnace and simultaneously injecting treating gases comprising steam through said blast electrode into the mass of heated carbon to violently agitate the same and carry upward to relatively greater distances the smaller particles of softer and more friable activated carbon, carrying such smaller particles of activated carbon out of the furnace while suspended in the current of treating gases, and separating such carbon particles from the gases.

3. The process of making decolorizing carbon which comprises feeding granular calcined dissolved vegetable carbonized material into a furnace, heating the granular carbon to temperatures over 800° C. by the electric current passing between an upper electrode and a lower rotary electrode slowly rotating adjacent the bottom of the furnace and simultaneously injecting treating gases comprising steam into the mass of heated carbon to violently agitate the same and carry upward to relatively greater distances the smaller particles of softer activated carbon, carrying such smaller particles of carbon out of the furnace while suspended in the current of treating gases, separating from the gases such carbon particles and cooling the same.

4. The process of making decolorizing carbon which comprises feeding granular carbonized material into a furnace, heating the granular carbon to temperatures over 800° C. by the electric current and simultaneously injecting treating gases into the mass of heated carbon to violently agitate the same and carry upward to relatively greater distances the smaller particles of activated carbon, carrying such smaller particles of carbon out of the furnace while suspended in the current of treating gases, separating from the gases such carbon particles and cooling the same.

5. The process of making decolorizing carbon which comprises feeding granular carbonaceous material into a tubular electric furnace, heating the granular carbon by an electric current capable of arcing between the carbon particles, injecting gases comprising steam into the mass of heated carbon to violently agitate the same and carry upward and out of the furnace particles of active decolorizing carbon, and cooling the same.

6. The process of making decolorizing carbon which comprises feeding granular carbonaceous material into an electric furnace, heating the granular carbon, injecting gases into the mass of heated carbon to carry upward and out of the furnace particles of active decolorizing carbon, and cooling the same.

7. The process of making decolorizing carbon which comprises feeding granular carbonaceous material into an electric furnace, heating the granular carbon, injecting gases into the mass of heated carbon to carry upward particles of active decolorizing carbon, and removing the same from the furnace.

8. The process of making decolorizing carbon which comprises feeding granular carbonized material into a furnace, heating the granular carbon and agitating the same and continuously separating smaller particles of activated carbon while suspended in a gaseous current.

9. The process of making decolorizing carbon which comprises feeding granular carbonized material into a furnace, heating the granular carbon and agitating the same and continuously separating particles of activated carbon.

10. The continuous process of activating porous granular decolorizing carbon formed from dissolved vegetable material, which comprises heating the carbon particles in a furnace and simultaneously injecting treating gases into the carbon particles to agitate the same and carry out of the lower part of the furnace the lighter activated carbon particles while suspended in the current of treating gases, and removing the gases and cooling the activated carbon particles.

11. The continuous process of activating granular decolorizing carbon, which comprises heating the carbon particles in a furnace and simultaneously injecting gases into the carbon particles to agitate the same and carry out of the lower part of the furnace activated carbon particles while suspended in the current of gases, and removing from the gases activated carbon particles.

12. The process of activating granular decolorizing carbon formed from dissolved organic material, which comprises heating and agitating the carbon particles, separating and carrying out of the lower part of the furnace the lighter activated carbon particles while suspended in a gaseous current, and cooling the activated carbon particles.

13. The process of activating decolorizing carbon which comprises heating and agitating the carbon particles, separating and carrying out of the lower part of the furnace lighter activated carbon particles, and cooling the activated carbon particles.

14. The process of activating porous granular decolorizing carbon formed from dissolved vegetable material, which comprises electrically heating the carbon particles in a furnace and simultaneously injecting treating gases comprising steam into the carbon particles to agitate the same and carry out of the furnace the lighter activated carbon particles while suspended in the current of treating gases, cooling such treated carbon particles and allowing the treating gases to neutralize free alkali therein.

15. The process of activating porous granular decolorizing carbon formed from dissolved vegetable material, which comprises heating the carbon particles in a furnace and simultaneously injecting treating gases comprising steam into the carbon particles, cooling such treated carbon particles and allowing the treating gases to neutralize free alkali therein.

16. The process of activating decolorizing carbon containing inorganic matter, which comprises electrically heating the carbon particles in a furnace and injecting treating gases comprising steam into contact with the carbon particles to decompose such inorganic matter, removing from the furnace activated carbon particles, cooling such carbon particles and allowing the treating gases to neutralize free alkali from the inorganic matter therein.

17. The process of activating decolorizing carbon containing inorganic matter, which comprises heating the carbon particles in a furnace and injecting treating gases into contact with the carbon particles to decompose such inorganic matter, removing from the furnace activated carbon particles, cooling such carbon particles and allowing the treating gases to neutralize free alkali from the inorganic matter therein.

18. The apparatus for activating decolorizing carbon comprising a vertical electric furnace, feeding means to continuously feed granular carbon into said furnace, electric heating means comprising an upper electrode and a rotary lower blast electrode formed with gas injecting openings, a cooled passage and connected centrifugal separator communicating with a discharge opening in said electric furnace, a vertically adjustable regulating valve adjusting the height or vertical extent of the effective discharge opening from said furnace into said separator and means to inject treating gases including steam through said blast electrode into the lower portion of said electric furnace.

19. The apparatus for activating decolorizing carbon comprising a vertical electric furnace, feeding means to feed granular carbon into said furnace, electric heating means comprising an upper electrode and a rotary lower electrode, a separator communicating with a discharge opening in said electric furnace, a vertically adjustable regulating valve adjusting the height or vertical extent of the effective discharge opening from said furnace into said separator and means to inject treating gases into the lower portion of said electric furnace.

20. The apparatus for activating decolorizing carbon comprising an electric furnace, having a discharge opening at an upper part thereof, a vertically adjustable regulating valve and cooperating cut off valve to adjust the height and effectiveness of said discharge opening and means to cause a gaseous current in the lower portion of said furnace.

21. The apparatus for activating decolorizing carbon comprising a furnace, enclosed feeding means to feed granular carbon into said furnace, electric heating means for said furnace comprising a rotary lower blast electrode formed with gas injecting openings, a water cooled passage and connected centrifugal separator communicating with a discharge opening in said furnace, and means to inject treating gases through said blast electrode into the lower portion of said electric furnace.

22. The apparatus for activating decolorizing carbon comprising a vertical electric furnace, electric heating means to heat the carbon furnace charge to activating temperature, means to inject treating gases into the lower portion of the furnace to effect the fluid suspension and agitation of a large proportion of the furnace charge and carry portions thereof out of the upper part of the furnace, and a cooperating separator to receive such particles.

23. The apparatus for activating decolorizing carbon comprising a vertical furnace chamber, electric heating means to heat a granular carbon charge to activating temperature, means to inject gaseous material and effect the fluid suspension and agitation of a large proportion of the charge and carry portions thereof to the upper part of said chamber, and a regulating discharge valve cooperating with said chamber to control discharge of suspended material therefrom and means to adjust the height and effective area of the opening of said discharge valve.

24. The apparatus for activating decolorizing carbon comprising a vertical furnace chamber, heating means to heat a granular carbon charge to activating temperature, means to inject gaseous material and effect the fluid suspension and agitation of a large proportion of the charge and carry portions thereof to the upper part of said chamber, and a regulating discharge valve cooperating with said chamber to control discharge of suspended material therefrom and means to adjust the height of the opening of said discharge valve.

25. The apparatus for activating decolorizing carbon comprising a vertical furnace, heating means adapted to heat a granular carbon furnace charge to activating temperature, and means to inject treating gases into the lower portion of the furnace to effect the fluid suspension and agitation of a large proportion of the furnace charge and carry portions thereof out of the upper part of the furnace.

26. The apparatus for activating decolorizing carbon comprising a furnace, heating means adapted to heat a granular carbon furnace charge to activating temperature, and means to inject treating gases into the furnace to effect the fluid suspension and agitation of a considerable proportion of the furnace charge and carry portions thereof out of the upper part of the furnace.

27. The apparatus for activating decolorizing carbon comprising an electric furnace having heating electrodes adapted to pass heating electric currents through the carbonaceous furnace charge and a discharge opening adjacent its upper portion and means to inject into said furnace jets of treating gases to agitate the charge of carbon in the furnace and carry the lighter more activated particles of carbon out of said discharge opening.

28. The apparatus for activating decolorizing carbon comprising an electric furnace, a discharge opening adjacent its upper portion and means to inject into said furnace gases to agitate the charge of carbon in the furnace and carry the lighter particles of carbon out of said discharge opening.

29. The apparatus for activating decolorizing carbon comprising a furnace having a discharge opening adjacent its upper portion and means to inject into said furnace jets of treating gases to agitate the charge of carbon in the furnace and carry lighter particles of activated carbon out of said discharge opening.

30. The apparatus for activating decolorizing carbon comprising a furnace having a discharge opening adjacent its upper portion and means to produce in said furnace a gaseous current to agitate the charge of carbon in the furnace and carry particles of activated carbon out of said discharge opening.

31. The apparatus for activating decolorizing carbon comprising an electric furnace, a discharge opening adjacent its upper portion, means to inject into said furnace gases to agitate the charge of carbon in the furnace and carry the lighter relatively ash-free particles of carbon out of said discharge opening, and an opening in the lower part of the furnace to remove the clinkered ash material from the carbon.

32. The apparatus for activating decolorizing carbon comprising a furnace having a discharge opening adjacent its upper portion, means to produce in said furnace a gaseous current to agitate the charge of carbon in the furnace and carry particles of activated carbon out of said discharge opening and an opening in the lower part of the furnace to remove the clinkered ash material from the carbon.

33. The process of activating decolorizing carbon formed from dissolved vegetable material, which comprises heating the carbon particles in a furnace and simultaneously injecting treating gases into the carbon particles to agitate the same and carry out of the lower part of the furnace the lighter activated relatively ash-free carbon particles while suspended in the current of treating gases, removing the gases and cooling the activated carbon particles and periodically removing from the lower part of the furnace the clinkered ash material from the carbon.

34. The process of activating decolorizing carbon which comprises heating the carbon particles in a furnace and simultaneously injecting treating gases into the carbon particles to carry out of the lower part of the furnace the lighter activated relatively ash-free carbon particles while suspended in the current of treating gases, and periodically removing from the lower part of the furnace the clinkered ash material from the carbon.

35. The process of activating decolorizing carbon which comprises heating the carbon particles in a furnace and simultaneously causing gas currents in the carbon particles to carry out of the lower part of the furnace the lighter relatively ash-free carbon particles and periodically removing from the lower part of the furnace the clinkered ash material from the carbon.

36. The continuous process of activating porous granular substantially uniformly sized decolorizing carbon formed from dissolved vegetable material of between about 10 and 50 linear mesh particles, which comprises heating the carbon particles in a furnace and simultaneously injecting treating gases into the carbon particles to agitate the same and carry out of the lower part of the furnace the lighter activated relatively ash-free carbon particles while suspended in the current of treating gases, and removing from the lower part of the furnace the clinkered ash material from the carbon.

37. The process of activating finely granular substantially uniformly sized decolorizing carbon formed from dissolved vegetable material, which comprises heating the carbon particles in a furnace and simultaneously injecting treating gases into the carbon particles to agitate the same and carry out of the lower part of the furnace the lighter activated relatively ash-free carbon particles while suspended in the current of treating gases, removing from the lower part of the furnace the clinkered ash material from the carbon.

38. The process of activating granular substantially uniformly sized decolorizing carbon of between 10 and 50 linear mesh particles, which comprises heating the carbon particles in a furnace and simultaneously injecting treating gases into the carbon particles to agitate the same and carry out of the lower part of the furnace the lighter activated carbon particles while suspended in the current of treating gases, removing the gases and cooling the activated carbon particles.

39. The process of activating granular decolorizing carbon, which comprises heating the carbon particles in a furnace and simultaneously injecting treating gases into the carbon particles to agitate the same and carry out of the lower part of the furnace the lighter activated carbon particles, removing the gases and cooling the activated carbon particles.

40. The continuous process of activating porous substantially uniformly sized finely granular decolorizing carbon formed from dissolved vegetable material, which comprises heating the carbon particles and simultaneously injecting gases into the carbon particles to agitate the same and separate the lighter activated carbon particles.

41. The process of activating porous finely granular decolorizing carbon, which comprises heating the carbon particles and simultaneously injecting gases into the carbon particles to agitate the same and separate the lighter activated carbon particles.

42. The process of activating granular decolorizing carbon, which comprises heating the carbon particles in a furnace and simultaneously injecting treating gases into the carbon particles to agitate the same and carry out of the lower part of the furnace the lighter treated carbon particles, removing the gases and cooling the treated carbon particles.

43. The process of activating carbon, which comprises heating the carbon particles and simultaneously injecting gases into the carbon particles to agitate the same and separate the lighter treated carbon particles.

44. The process of activating decolorizing carbon formed from dissolved organic material and containing inorganic matter, which comprises heating the carbon particles in an electric furnace to fuse and remove the greater portion of the inorganic matter therein, and injecting treating gases into contact with the carbon particles to decompose and neutralize free alkali from the remaining inorganic matter therein.

45. The process of activating decolorizing carbon formed from dissolved organic material and containing inorganic matter, which comprises heating the carbon particles in an electric furnace to fuse and remove the greater portion of the inorganic matter therein.

46. The process of activating granular carbon containing inorganic matter, which comprises heating the carbon particles in an electric furnace to fuse and separate a large portion of the inorganic matter therein, and produce a substantially neutral highly activated carbon.

47. The process of activating carbon containing inorganic matter, which comprises heating the carbon in an electric furnace to separate a large portion of the inorganic matter therein.

48. The process of activating granular decolorizing carbon formed from dissolved organic material, which comprises electrically heating and agitating the carbon particles and fusing inorganic ash components thereof to produce activated carbon having less than half the ash content of the original carbon.

49. The process of activating decolorizing carbon formed from dissolved organic material, which comprises heating and agitating the carbon particles and fusing inorganic ash components thereof to produce activated carbon having less than half the ash content of the original carbon.

50. The process of activating decolorizing carbon formed from dissolved organic material and containing inorganic matter, which comprises heating the carbon particles in an electric furnace by causing current to pass therethrough to fuse and remove a portion of the inorganic matter therein.

51. The process of activating carbon containing inorganic matter, which comprises heating the carbon in an electric furnace by causing current to pass therethrough to fuse and remove a portion of the inorganic matter therein.

LEONARD WICKENDEN.
STANLEY A. W. OKELL.